Patented May 2, 1939

2,156,431

UNITED STATES PATENT OFFICE 2,156,431

COMPOSITION OF MATTER AND METHOD OF MAKING THE SAME

Joseph N. Kuzmick, Passaic, N. J., assignor, by mesne assignments, to Irvington Varnish & Insulator Co., Irvington, N. J., a corporation of New Jersey No Drawing. Application June 11, 1937, Serial No. 147,676

5 Claims. (Cl. 260—46)

The present invention relates generally to methods for and to products obtained by reacting polymerized cashew nut shell liquid and hexamethylenetetramine; and the present invention relates more particularly to millable reaction products of polymerized cashew nut shell liquid and hexamethylenetetramine and to methods and steps of making and using the same.

The advantages of cashew nut shell liquid and hexamethylenetetramine and the products obtained thereby are described in various patents of Harvey, particularly Patent Numbers 1,725,791, 1,725,797, 1,838,077 and 1,921,292. Methods of polymerizing cashew nut shell liquid are described in application Serial No. 27,538, filed June 20, 1935, for which Patent No. 2,067,919 has been issued January 19, 1937.

An advantage of the millable reaction product of polymerized cashew nut shell liquid with hexamethylenetetramine of the present invention is that it serves as a plasticizer for natural rubber and also for artificial rubber of the kind made by polymerizing chloro butadiene and of the type made by polymerizing diethylene polysulphide. Such artificial rubbers are exemplified by the materials sold on the market under the trade-mark names "Duprene" and "Thiokol", respectively.

Other objects and advantages of the present invention will be clear from the following disclosure of methods and products of the present invention and from the claims appended hereto.

An example of a method of polymerizing cashew nut shell liquid for the purposes of the present invention comprises mixing a given volume of cashew nut shell liquid with about 2% of its volume of concentrated sulphuric acid, with the use of a diluting material for the sulphuric acid, and thoroughly distributing the latter throughout the body of the cashew nut shell liquid before reaction between these two materials is initiated. The diluting material can be water or an alcohol, as examples; an example of an alcohol being propyl alcohol. The alcohol has the advantage of being a solvent for the sulphuric acid and also being soluble itself in the cashew nut shell liquid. The diluting material is used in sufficient quantity to render the sulphuric acid unreactive or comparatively slowly reactive with the cashew nut shell liquid at the temperature at which mixing is started, for example at normal temperature. Equal volumes of concentrated sulphuric acid and the diluting material, water or alcohol, produces enough dilution to reduce the polymerizing effect of the sulphuric acid sufficiently to obtain a thorough mixture and a uniform final product. The mixture of cashew nut shell liquid, sulphuric acid and diluting material is stirred to complete distribution of the materials throughout each other after which stirring is continued and heat is applied to remove the diluting material and to initiate and bring about the polymerizing reaction of the sulphuric acid on the cashew nut shell liquid. A thorough distribution of the sulphuric acid by means of a diluent and by stirring insures the making of a material which is uniform throughout when the polymerizing reaction is brought about. After the diluting material has been vaporized off the temperature is carried up to about 330° F. after which the polymerized cashew nut shell liquid obtained is allowed to cool. The polymerized cashew liquid obtained in this matter is a liquid of about the viscosity of molasses.

The amount of sulphuric acid can be varied and the time and temperature of heating accordingly varied to obtain the pollymerized cashew nut shell liquid in a liquid condition.

The amount of hexamethylenetetramine used with the polymerized cashew nut shell liquid can be varied to suit the use to which reaction product of these two is put or to suit the final product made and to suit the conditions under which they are made. For example from about 1% to about 15% by weight of hexamethylenetetramine can be mixed into the polymerized cashew nut shell liquid in a dough mixer to get thorough distribution. The mixture then can be cured for about 2 to 3 hours at about 275° F. to obtain a product which is suitable by itself as a plastic material or can be used as a plasticizer and modifier for rubber, "Duprene", "Thiokol", or mixtures of any or all of these with other products. With this heating the consistency of the product is such that it is suitable for milling or mixing on rubber mixing rolls. To this product sulphur may be added and the product vulcanized.

Examples of ratios of cashew nut shell liquid and hexamethylenetetramine, with time and temperature for heating them, to secure reaction products millable on rubber mixing rolls and suitable also for incorporation with rubber, "Duprene" and "Thiokol" or with any mixture of any of these, are as follows:

*Example 1.*—One hundred parts by weight of polymerized cashew nut shell liquid in a liquid state and about one and one-half parts of hexamethylenetetramine are mixed together in a dough mixer for about one hour, after which the mix is cured in the oven for about two and one-half hours at about 275° F. The product when cool is rubber like and can be milled on rubber mixing rolls, and can be used for the general compounding of rubber mixtures to impart to rubber mixtures special qualities, due to its characteristics of being resistant to oils, solvents, chemicals and the like, to lengthen the life of the rubber mixtures. The "rubber mixture", in some cases, can be free of natural rubber and be made up entirely of artificial rubber or rubber substitutes, or it can be made of mixtures of natural rubber and artificial rubber or rubber substitutes, or it can be all natural rubber except for the cashew nut shell liquid product of the present invention, as can be seen from the description and disclosure above made. The loss of weight is about two per cent.

*Example 2.*—Another example is similar to Example 1 except that hexamethylenetetramine in about three parts by weight is used to one hundred parts of the liquid state polymerized cashew nut shell liquid, the time of mixing and time and temperature of curing being the same. The loss of weight is about three per cent.

*Example 3.*—In a third example the amount of hexamethylenetetramine is about twelve parts by weight to one hundred parts of the liquid state polymerized cashew nut shell liquid. The time of mixing and time and temperature of curing is about the same as in Examples 1 and 2. The loss of weight is about four per cent.

The examples given above are for batches of about one to three hundred pounds, and the time and temperature of curing can be varied to suit the rate of cooling as may be necessary to suit smaller or larger batches.

I claim:

1. The method which comprises reacting sulphuric acid polymerized cashew nut shell liquid which is in a flowable state with hexamethylenetetramine to a rubbery millable state.

2. The method which comprises reacting sulphuric acid polymerized cashew nut shell liquid which is in a flowable state with hexamethylenetetramine, with the aid of heat, until a product is reached which can be milled on rubber mixing rolls.

3. The heat reaction product of a flowable sulphuric acid polymerized cashew nut shell liquid and hexamethylenetetramine, which product is in a rubbery state suitable for milling on rubber mixing rolls.

4. The method which comprises reacting sulphuric acid polymerized cashew nut shell liquid which is in a flowable state with hexamethylenetetramine, with the aid of heat, until a product is reached which can be milled on rubber mixing rolls and adding sulphur and vulcanizing.

5. The product of claim 3 after it has been vulcanized with sulphur.

JOSEPH N. KUZMICK.